(12) United States Patent
Trost

(10) Patent No.: US 9,462,429 B2
(45) Date of Patent: Oct. 4, 2016

(54) MISSED CALL NOTIFICATION BY NOTIFYING CONTACTS OF THE CALLED PARTY

(71) Applicant: FutureWei Technologies, Inc., Plano, TX (US)

(72) Inventor: April Trost, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 288 days.

(21) Appl. No.: 14/105,004

(22) Filed: Dec. 12, 2013

(65) Prior Publication Data
US 2015/0172877 A1    Jun. 18, 2015

(51) Int. Cl.
*H04M 1/725*    (2006.01)
*H04W 4/12*    (2009.01)

(52) U.S. Cl.
CPC ...................................... *H04W 4/12* (2013.01)

(58) Field of Classification Search
None
See application file for complete search history.

(56) References Cited

U.S. PATENT DOCUMENTS

| | | | |
|---|---|---|---|
| 2006/0242639 A1 | 10/2006 | Manion et al. | |
| 2007/0133771 A1* | 6/2007 | Stifelman | H04M 3/48 379/142.01 |
| 2010/0216518 A1* | 8/2010 | McPhail | H04M 1/0218 455/567 |
| 2014/0120863 A1* | 5/2014 | Ferguson | H04W 4/22 455/404.2 |
| 2014/0273976 A1* | 9/2014 | Kim | H04W 4/027 455/412.2 |
| 2015/0163354 A1* | 6/2015 | Nezarati | H04M 3/42068 379/142.04 |

FOREIGN PATENT DOCUMENTS

| | | |
|---|---|---|
| CN | 1684486 A | 10/2005 |
| CN | 101167068 A | 4/2008 |
| CN | 101640864 A | 2/2010 |
| CN | 102883289 A | 1/2013 |
| CN | 103179508 A | 6/2013 |

OTHER PUBLICATIONS

"Commercial Mobile Telephone Alerts (CMAS)," Public Safety and Homeland Security Bureau Federal Communications Commission, 1 page, retrieved Jan. 8, 2014 from http://transition.fcc.gov/pshs/services/cmas.html.
3GPP, "Digital cellular telecommunications system (Phase 2+); Universal Mobile Telecommunications System (UMTS); Technical realization of the Short Message Service (SMS); (3GPP TS 23.040 version 9.3.0 Release 9)." ETSI TS 123 040 V9.3.0, Oct. 2010, 204 pages.
"SMS About Missed Calls," LMT OKARTES, 2 pages, retrieved Jan. 9, 2014 from www.okarte.lv/eng/pakalpojumi/iszinu__pakalpojumi/sms__par__nesanemtajiem__zvaniem.
Axon,S., "How to: Set Up Missed Call Notifications in Google Voice," Mashable.com, Sep. 7, 2010, 10 pages, retrieved Jan. 9, 2014 from http://mashable.com/2010/09/07/google-voice-missed-calls.
International Search Report and Written Opinion received in International Application No. PCT/CN2014/093658 mailed Mar. 25, 2015, 13 pages.

\* cited by examiner

*Primary Examiner* — Suhail Khan
(74) *Attorney, Agent, or Firm* — Slater Matsil, LLP

(57) ABSTRACT

Users can be alerted of important missed calls while away from their mobile device by sending missed call notifications to contacts of the user, which may include friends, family, colleagues, or other people/entities associated with the called party. The missed call notifications may include text or automated voicemail messages, email messages, and/or messages sent via a social networking site or service to name a few, and can specify information pertaining to the missed call and/or the calling party. Missed call notifications can be triggered when one or more predefined conditions are met, such as when the mobile device is deemed not to be in the possession of the user and/or the missed call is deemed to be important. Missed call notifications can originate from the mobile device or a network device.

53 Claims, 9 Drawing Sheets

MISSED CALL NOTIFICATION BY NOTIFYING CONTACTS OF THE CALLED PARTY

TECHNICAL FIELD

The present invention relates generally to telecommunications, and, in particular embodiments, to techniques for Missed Call Notification by Notifying Contacts of the Called Party.

BACKGROUND

The recent proliferation of wireless telecommunications has led many subscribers to become more and more reliant on their mobile devices. For some users, it is important to remain reliably accessible via their mobile phones so that family, business contacts, and clients can reach them at a moment's notice. Nevertheless, users may be unable to access their mobile phone in some circumstances, and may consequently miss a call relating to an important issue, such as a family emergency or a professional obligation requiring the user's immediate attention.

SUMMARY OF THE INVENTION

Technical advantages are generally achieved by embodiments of this disclosure which describe techniques for missed call notification that include notifying contacts of the called party.

In accordance with an embodiment, a method for performing missed call notification is provided. In this example, the method includes detecting a missed call from a calling party to a mobile device of a called party, and sending a notification of the missed call to one or more predefined contacts of the called party when one or more predefined conditions have been satisfied. An apparatus and computer program product for performing this method are also provided.

In accordance with another embodiment, a network device for facilitating missed call notification is provided. In this example, the network device is configured to determine that a missed call originating from a calling number was received by a mobile device, to determine that the calling number is included in a list of privileged calling numbers, and to send a notification of the missed call to one or more predefined contacts of the called party when one or more predefined conditions have been satisfied.

In accordance with another embodiment, a system for generating missed call notifications is provided. In this example, the system includes a mobile device associated with a called party and one or more network devices. The mobile device and the one or more network devices are individually or collectively configured to determine that a missed call was received on the mobile device from a calling number, and to send a notification of the missed call to one or more contacts of the called party when one or more predefined conditions have been satisfied.

In accordance with another embodiment, a method for facilitating compilation of missed call notification contact lists is provided. In this example, the method includes receiving an invitation from a mobile device and prompting the candidate contact to accept or decline the invitation. The invitation invites a candidate contact to be included in a list of contacts that will be notified when missed calls are received on the mobile device. An apparatus and computer program product for performing this method are also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
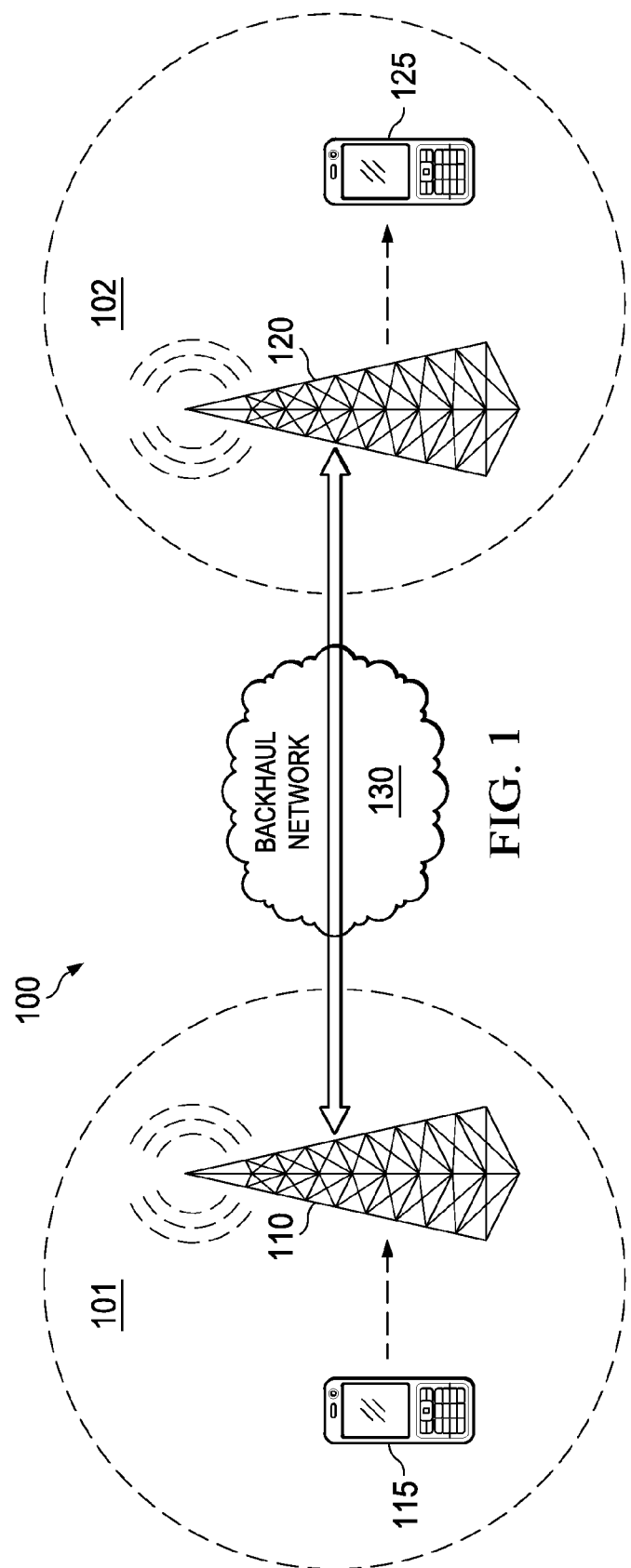
FIG. 1 illustrates a diagram of a wireless network for communicating data.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Techniques and mechanisms for promptly alerting users of important missed calls when they are away from their mobile devices are desired. Aspects of this disclosure provide techniques for leveraging social networking to alert users of missed calls when they are away from their mobile device. More specifically, a mobile device may attempt to alert a called party of a missed call by sending missed call notifications to contacts of the called party, such as friends, family, colleagues, or other people that are likely to be with the user. In an embodiment, a missed call notification may also be forwarded to another device associated with (e.g., registered to) the called party. By way of example, the missed call notification may be sent to a smart watch associated with the user. The missed call notifications may include any means (e.g., messages, etc.) for asking contacts to notify a called party of a missed call. In one embodiment, the missed call notifications comprise a text or automated voicemail message sent to a contact's phone (mobile, landline, or otherwise). In another embodiment, the missed call notifications comprise an email message sent to a contact's email address. In yet another embodiment, the missed call notifications include a message sent to a contact via a social networking site or service (e.g., Facebook, Twitter, etc.). A social networking site or service may be a platform or interface in which users/entities interact with one another to build or maintain relationships or associations.

The missed call notifications may specify information pertaining to the missed call, such as a time the missed call was received and/or whether a voice mail is associated with the missed call. The missed call notifications may also specify information pertaining to the calling party, such as a name of the calling party, a calling number of the calling party, etc. In some embodiments, the missed call notifications are triggered when a mobile device is deemed not to be in the possession of the user, as may be the case when the mobile device has not been accessed for a period of time and/or has remained in the same location for a period of time. Parameters related to missed call notification techniques of this disclosure may be configurable by the user. For instance, the user may select which contacts receive missed call notifications, and which calling numbers trigger the missed call notification if the device is deemed not to be in the possession of the user, etc. In some embodiments, candidate contacts are asked to consent to participate in missed call notifications prior to being added to a missed call notification list. These and other aspects are described in greater detail below.

In some circumstances, calls may go unanswered by called parties. FIG. 1 illustrates a network 100 comprising an access point (AP) 110 having a coverage area 101, an AP 120 having a coverage area 102, and a backhaul network 130 for allowing the AP 110 to communicate with the AP 120, and vice versa. In this example, a called mobile device 125 receives a missed call from a calling mobile device 115.

Figure 2:
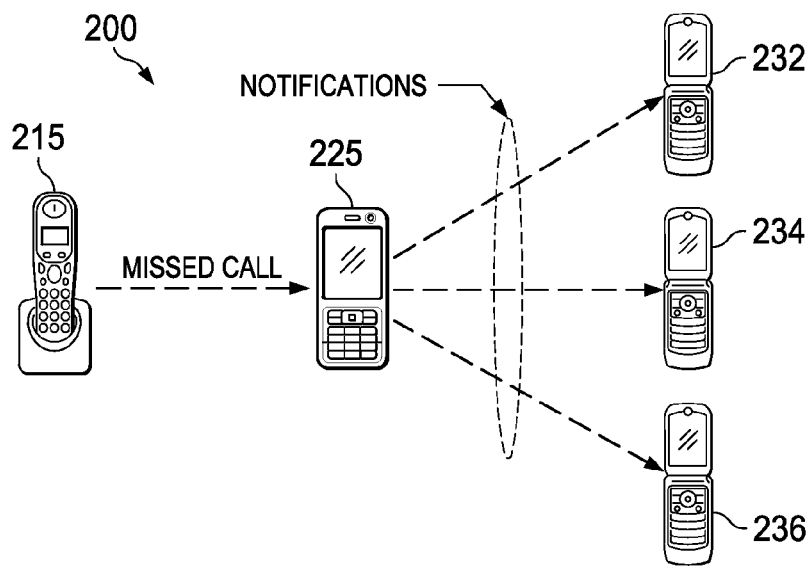
FIG. 2 illustrates a diagram of an embodiment system for notifying a called party of a missed call.

Aspects of this disclosure provide missed call notification techniques that notify called parties of missed calls by sending missed call notifications to contacts of the called party. FIG. 2 illustrates an embodiment system 200 for notifying a called party of a missed call. The system 200 includes a calling party 215, a mobile device 225 of a called party, and a plurality of contacts 232-236 of the called party. The calling party 215 may be any device, entity, or person from which a call originates. The called party may be any entity or person to which a call is placed (e.g., an intended recipient of a call), and the mobile device 225 may be any wireless device associated with (e.g., used by, registered to, etc.) the called party. Contacts may be any device, entity, or destination (e.g., email address, phone number, etc.) to which missed call notifications are sent. In some embodiments, missed call notifications may be sent to another device associated with the called party, such as a smart watch (e.g., a watch or bracelet capable of receiving messages). As shown, the mobile device 225 sends notifications to the contacts 232, 234, 236 of the called party after receiving a missed call from the calling party 215. The calling party 215 and contacts 232, 235, 236 may use any device/interface when communicating with the mobile device 225, including wireless calling platforms (e.g., mobile phones, tablets, etc.), wireline calling platforms (e.g., landlines, devices operating via Skype or some other internet calling service, etc.), social networking sites (e.g., Facebook, etc.) and others. The mobile device 225 may be any wireless calling platform (e.g., mobile phone, tablet, etc.) that is capable of receiving missed calls and sending missed call notifications. The missed call notifications can include any means of communication, including SMS, EMS, MMS, automated-voice messages, and messages communicated over a social networking site to name a few.

Figure 3:
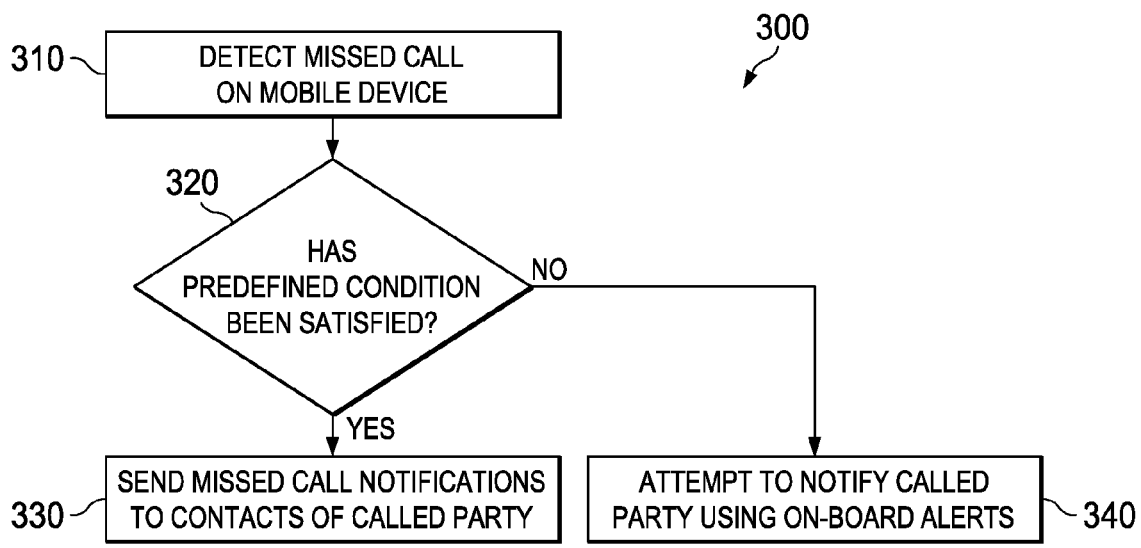
FIG. 3 illustrates a flowchart of an embodiment method for missed call notification.

FIG. 3 illustrates an embodiment method 300 for missed call notification, as may be performed by a mobile device or a network device (e.g., a network side device operated by a service provider, etc.). As shown, the method 300 begins at step 310, where a missed call is detected on a mobile device. The missed call may be detected when a call is not answered by a called party. Next, the method 300 proceeds to step 320, where it is determined whether a predefined condition has been satisfied. The predefined condition may include any condition (or set of conditions) configured to trigger missed call notifications. In one example, the predefined condition is satisfied when a calling number is included in a list of privileged calling numbers. In another example, the predefined condition is satisfied when the mobile device has not been accessed or moved within a predefined time-period. In yet another example, the predefined condition is satisfied when the calling number is included in the list of privileged calling numbers and the mobile device is not in the user's possession.

If the predefined condition has been satisfied, the method 300 proceeds to step 330, where missed call notifications are sent to contacts of the called party asking the recipient contacts to notify the called party of the missed call. The missed call notifications may include information relating to the missed call and/or the calling party. The missed call notifications may be made in parallel to the contacts of the user, or they may be made serially. If done serially, the sequence may be stopped if the mobile device receives an indication that the user has been informed of the missed call, such as by the mobile device calling the missed call calling number or checking a voice mail left by the missed call calling number.

If the predefined condition has not been satisfied, then the method 300 proceeds to step 340, where the mobile device attempts to notify the called party using on-board alerts, e.g., ringing, vibration, etc. In some embodiments, on-board alerts may be used in conjunction to sending missed call notification messages to contacts of the called party. The step 340 can be excluded from the method 300 altogether, or otherwise selectively applied based on, for example, a priority associated with the missed call.

Figure 4:
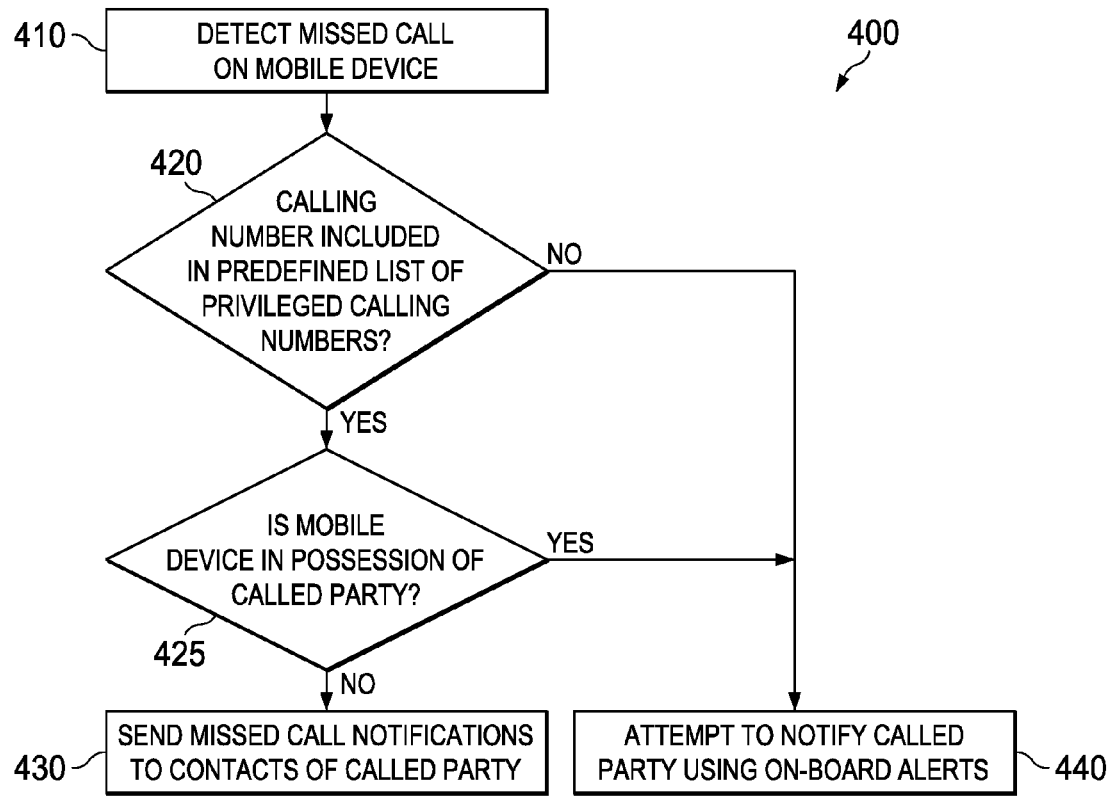
FIG. 4 illustrates a flowchart of another embodiment method for missed call notification.

FIG. 4 illustrates another embodiment method 400 for missed call notification, as may be performed by a mobile device or a network device. As shown, the method 400 begins at step 410, where a missed call is detected on the mobile device. Next, the method 400 proceeds to step 420, where it is determined whether a calling number is included in a predefined list of privileged calling numbers. If so, the method 400 proceeds to step 425, where it is determined whether the called party is in possession (or is likely in possession) of the mobile device. In one embodiment, the mobile device may be deemed to be in possession of the called party when the mobile device has been accessed or moved within a predefined time period. The location of the mobile device can be assessed using any number of means, such as a global positioning sensor (GPS), access point connectivity, gyroscope, etc., on the mobile device. In some embodiments, the location and/or position of the mobile device may be assessed by a network device based on the mobile device's service history. If the mobile device is deemed not to be in possession of the called party, then the method 400 proceeds to step 430, where missed call notifications are sent to contacts of the called party. If it is determined that either the calling number is excluded from a predefined list of privileged calling numbers (step 420) or that the called party is in possession of the mobile device (step 425), then the method 400 proceeds to step 440, where the called party is notified using on-board alerts of the mobile device. Step 440 may be excluded from the method 400 in some implementations.

One or more steps of a missed call notification technique can be performed by network devices other than the called mobile device, such as devices operated by a service provider or network operator. The term network device should be interpreted to include any device that is not a mobile device. A network device may be operated by a service provider, a network provider, or any other party/entity facilitating mobile communications. For example, the network device may be a server or other piece of equipment in a central office. Alternatively, the network device may be a server or other piece of equipment operated by a cloud computing network service provider. The network device may store a predefined missed call notification contact list and/or a list of privileged calling numbers for a mobile device, which may be preconfigured by a user prior to the missed call being received on the mobile device. The network device may generate and send missed call notifications to contacts of the called party upon determining that the predefined condition of sending notification to the contacts is satisfied. The network device may detect missed calls upon receiving an indication from the mobile device. Alternatively, the network device may utilize voice call parameter information to determine when a missed call has been received on a mobile device. For example, the network device may determine that a call has been missed when the call is terminated within a predefined period of time, which commonly occurs when a call goes unanswered by a calling party. The network device may also determine that a call is missed when a calling party leaves a voicemail. In some embodiments, the network device may verify that a predefined condition has been satisfied prior to sending missed call notifications. For example, the network device may determine that a mobile device has been in the same location for a period of time when the mobile device has been paged by a single access point during that period. As another example, the network may detect that a mobile device (or called number) has received a burst of consecutive calls from the same calling number within a predefined period of time. In some situations, the network may also determine that the called mobile device has not returned, or otherwise addressed or responded to, the missed calls within a predefined period of time.

Missed call notifications may be processed using different contact lists and/or privileged caller lists during different time periods. For instance, work related contacts may receive missed call notifications when a missed call is received during a user's standard office hours, while a user's family members may receive missed call notifications when a missed call is received outside a user's standard office hours. In some embodiments, the missed call notification periods may be defined by a user's calendar.

Figure 5:
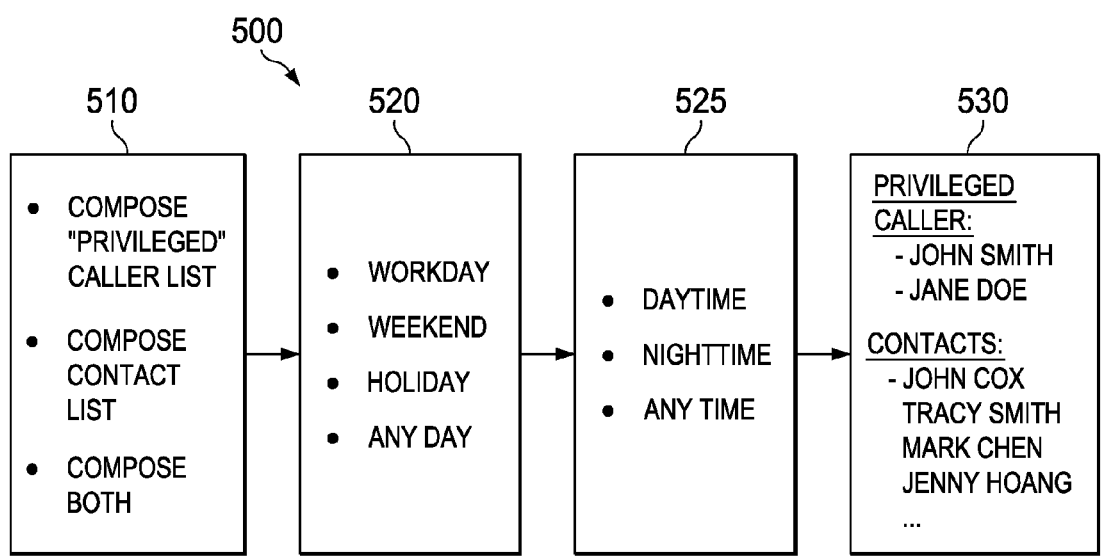
FIG. 5 illustrates a diagram of an embodiment user interface for configuring contact lists and privileged caller lists on a mobile device.

Missed call notification parameters may be configured by a user. FIG. 5 illustrates a user interface 500 for configuring contact lists and privileged caller lists. As shown, the user interface 500 includes screens 510-530 for configuring various missed call notification parameters. The user may use the screen 510 to compose a privileged caller list, a contact list, or both. The privileged caller list may be a list of calling parties/numbers that qualify for a missed call notification, while the contact list may be a list of contacts to which missed call notifications are sent. After selecting which list(s) to configure, the user may be prompted by the screens 520, 525 to select time periods to associate with the configured lists. In this example, the screen 520 prompts the user to select which days are associated with the list (e.g., workdays, weekends, holidays, or anyday), while the screen 525 prompts the user to select which time is associated with the list(s) (e.g., daytime, nighttime, or anytime). In some embodiments, parameters of the calling lists may be completely configurable by the user. For example, the user may specify that a daytime period runs from 9 am to 5 pm. The screen 530 allows the user to add calling numbers/parties to the privileged caller list, as well as to add missed call notification contacts to the contacts list.

Figure 6:
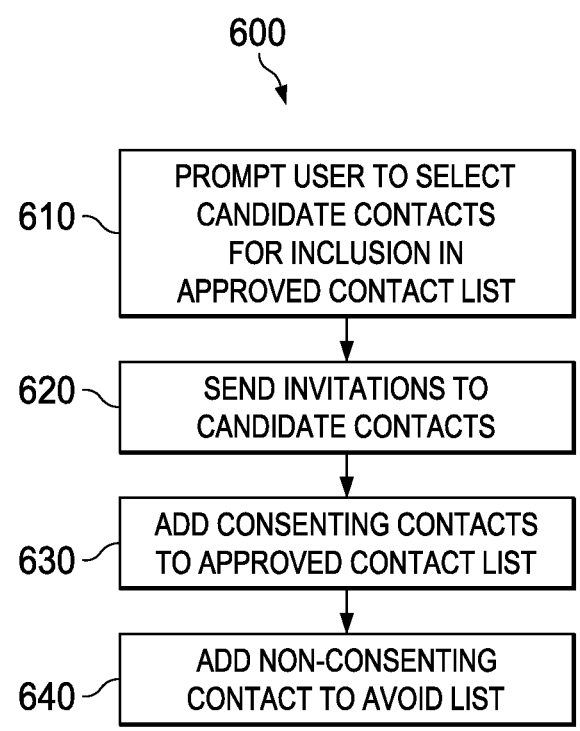
FIG. 6 illustrates a flowchart of an embodiment method for compiling an approved contact list for missed call notification.

Consent may be obtained prior to adding candidate contacts to a missed call notification contact lists. A candidate contact may be any device or entity which has been selected for inclusion in a missed call notification contact list. In some cases, candidate contacts may be contacts which are invited to participate in a missed call notification contact list. FIG. 6 illustrates a method 600 for compiling a missed call notification contact list. As shown, the method 600 begins with step 610, where the user is prompted to select candidate contacts for inclusion in the list of approved contacts. Thereafter, the method 600 proceeds to step 620, where the mobile device sends invitations to each selected candidate contact. The invitations may ask the candidate contacts to consent to being added to the missed call notification contact list. The candidate contacts may accept, decline, or ignore the invitation. Next, the method 600 proceeds to step 630, where the mobile stations add consenting contacts to the approved contact list. Thereafter, the method 600 proceeds to step 640, where the mobile station adds non-consenting contacts to an avoid list. The avoid list may include a list of contacts that prefer not to participate in missed call notification for the user. In some embodiments, contacts included in the avoid list are precluded from being added to future missed call notification contact lists. In other embodiments, the avoid list serves a passive or active reminder that the listed contacts prefer not to participate in missed call notification.

In some embodiments, missed call notification contact lists may be automatically adjusted/updated to remove contacts that habitually or repeatedly ignore missed call notification requests. The mobile device (or network device) may determine which contacts have ignored a missed call notification in various ways. In one embodiment, the missed call notification message prompts the recipient contact to acknowledge receipt of the message (e.g., "858-931-4827 has been trying to contact Randy. Can you let him know? Please select 'acknowledge' to confirm receipt of this message."). In another embodiment, the missed call notification message includes an ignore option (e.g., "858-931-4827 has been trying to contact Randy. Can you let him know? Select 'ignore' to disregard this message."). Other techniques may also be available, e.g., read receipt, subsequently polling called party, etc. In some embodiments, the called party may be prompted prior to removing a contact from the missed call notification contact list (e.g., "Ok to remove 'John' from missed call notification contact list?").

In some embodiments, user interfaces may be installed on devices used by contacts of the user to facilitate compilation of missed call notification contact lists and/or to facilitate delivery of missed call notifications. For example, a user interface may allow candidate contacts to quickly accept or decline invitations. Alternatively, missed call notification contact lists can be completely manually created by the user.

Figure 7:
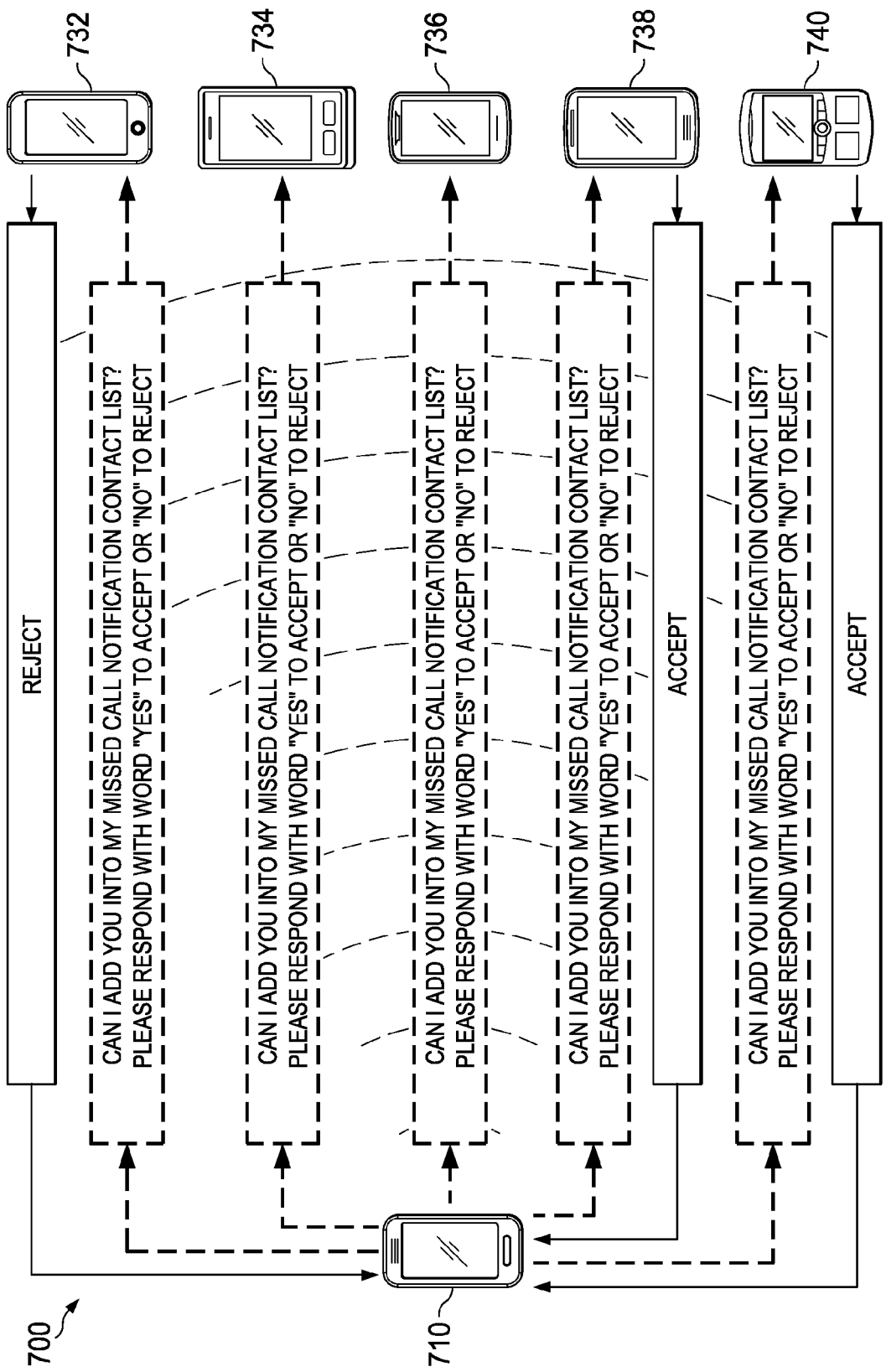
FIG. 7 illustrates a diagram of an embodiment system for compiling an approved contact list for missed call notification.

FIG. 7 illustrates a system 700 in which a mobile device 710 invites a plurality of contacts 732-740 to be included in a missed call notification contact list. As shown, the contact 732 declines the invitation, the contacts 734, 736 ignore the invitation, and the contacts 738, 740 accept the invitation. In some embodiments, consenting contacts may include only those contacts that affirmatively accept the invitation, in which case contacts that ignore the invitation (e.g., contacts 734, 736) would be excluded from the approved contacts list. In other embodiments, consenting contacts may include any contacts that do not affirmatively decline the invitation, in which case contacts that ignore the invitation (e.g., contacts 734, 736) would be included in the approved contacts list. In some embodiments, non-consenting contacts may be added to an avoid list in order to preclude those contacts from being added to future missed call notification contact lists or otherwise to remind the user of a non-consenting contact's preference in regards to missed call notification contact lists. When compiling the avoid list, non-consenting contacts may include only those contacts that affirmatively decline the invitation, in which case contacts ignoring the invitation (e.g., contacts 734, 736) would be excluded from the avoid list. Alternatively, non-consenting contacts may include any contacts that do not affirmatively accept the invitation, in which case contacts that ignore the invitation (e.g., contacts 734, 736) would be included in the avoid list. In some embodiments, contacts that ignore the invitation (e.g., contacts 734, 736) would be excluded from both the approved contacts list and the avoid list, thereby allowing those contacts to be invited to missed call notification lists in the future.

Figure 8:
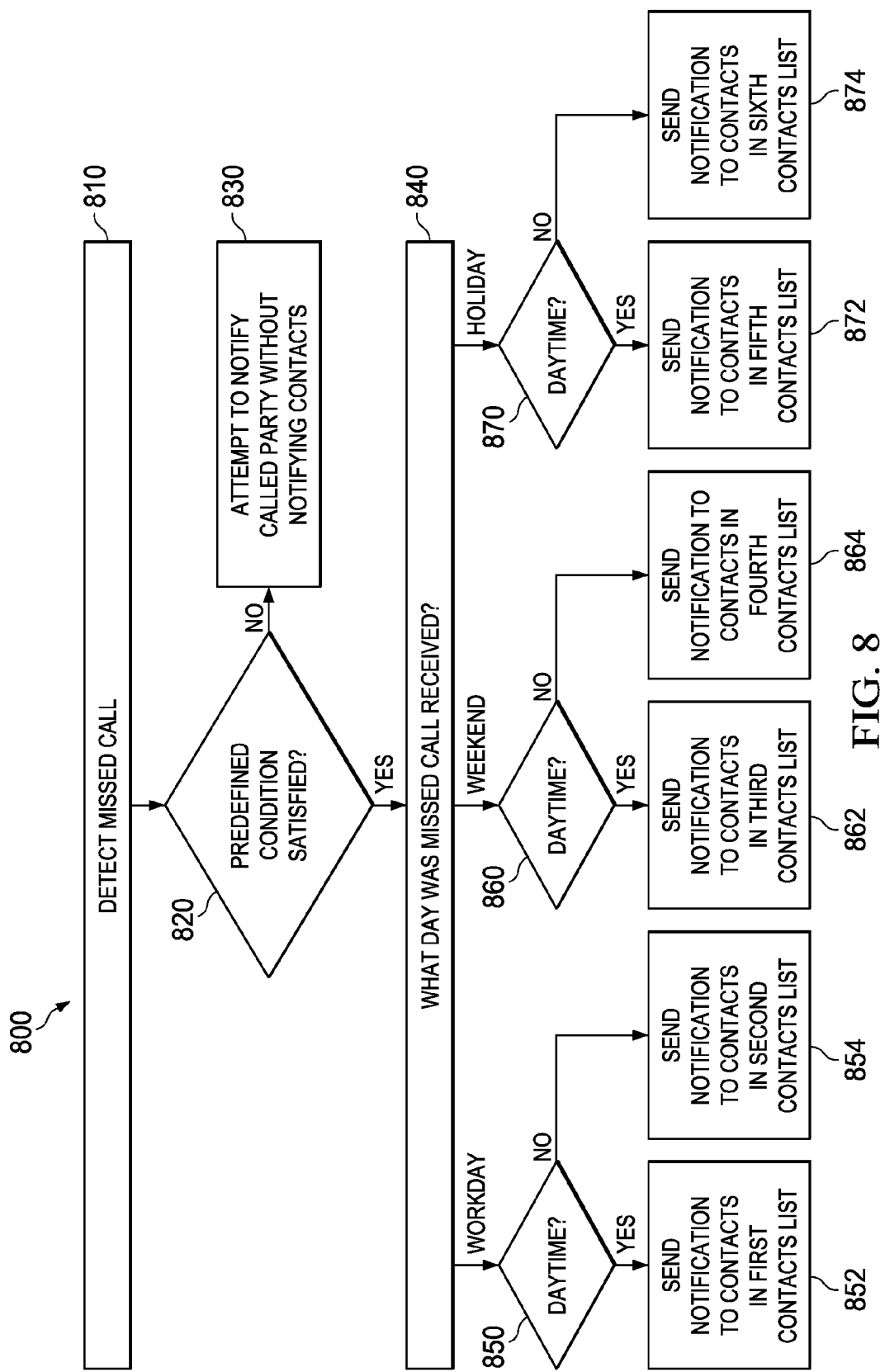
FIG. 8 illustrates a flowchart of an embodiment method for processing a missed call on a mobile device.

Different missed call notification contact lists may be used for different time-periods. FIG. 8 illustrates a method 800 for processing a missed call on a mobile device. As shown, the method 800 begins at step 810, where the mobile device detects a missed call from a calling user. Thereafter, the method 800 begins at step 820, where the mobile device determines whether a predefined condition has been satisfied. The predefined condition may include any condition for triggering missed call notification. For example, the predefined condition may be satisfied when a calling number/party is included in a list of privileged calling numbers, when the missed call is deemed urgent, when the called party is not in possession of the mobile device at the time missed call was received, when the mobile device has not been accessed by the called party for a predefined period of time, or combinations thereof. If the predefined condition(s) has not been satisfied, the method 800 proceeds to step 830, where the mobile device notifies the called party in accordance with on-board alerts or by dialing a pre-configured alternative number of the user without sending notifications to contacts of the called party. If the predefined condition(s) has been satisfied, then the method 800 proceeds to step 840, where the mobile device determines what day the missed call was received.

If the missed call was received on a workday, then the method proceeds to step 850, where the mobile device determines whether the missed call was received during a daytime period. If so, then the method 800 proceeds to step 852, where the mobile device sends notifications to contacts in a first contacts list. Otherwise, if the missed call was not received during the daytime period, then the method 800 proceeds to step 854, where the mobile device sends notifications to contacts in a second contacts list.

If the missed call was received on a weekend, then the method proceeds to step 860, where the mobile device determines whether the missed call was received during a daytime period. If so, then the method 800 proceeds to step 862, where the mobile device sends notifications to contacts in a third contacts list. Otherwise, if the missed call was not received during the daytime period, then the method 800 proceeds to step 864, where the mobile device sends notifications to contacts in a fourth contacts list.

If the missed call was received on a holiday, then the method proceeds to step 870, where the mobile device determines whether the missed call was received during a daytime period. If so, then the method 800 proceeds to step 872, where the mobile device sends notifications to contacts in a fifth contacts list. Otherwise, if the missed call was not received during the daytime period, then the method 800 proceeds to step 874, where the mobile device sends notifications to contacts in a sixth contacts list. The user may select which contacts are included in the different contact lists. The first, second, third, fourth, fifth, and sixth contact lists may include the same or different contacts. While the method 800 is described as being performed by a mobile device, one or more steps may alternatively be performed by a network device.

Figure 9:
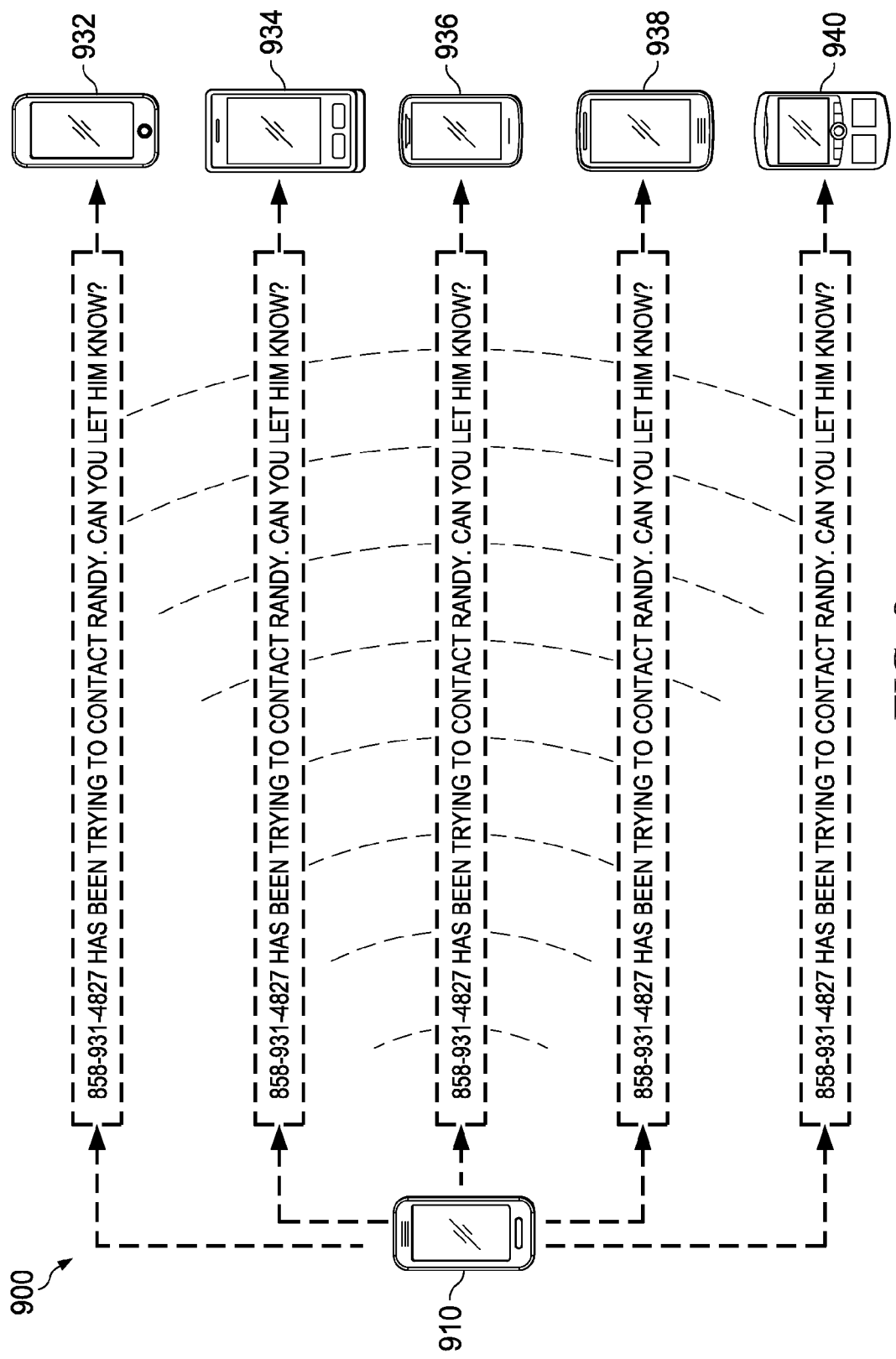
FIG. 9 illustrates a diagram of an embodiment system for sending missed call notifications to contacts of a called party.

FIG. 9 illustrates a system 900 in which a mobile device 910 sends a missed call notification to a plurality of contacts 932-940 in a missed call notification contacts list. As shown, a mobile device 910 of a called party ("Randy") receives a missed call from a calling number ("858-931-4827"), and sends missed call notifications to the contacts 932-940 in a missed call notification contacts list. In this example, the notification specifies that the calling number (858-931-4827) is attempting to contact the called party, and asks the recipient contact to notify Randy of the missed call. In other examples, the notification may specify other information associated with the calling party (e.g., a name of the calling party, etc.) and/or information pertaining to the missed call (e.g., time of missed call, how many missed calls are received from the same calling party, whether a voice mail was left by calling user, etc.). The number of missed calls received from the same calling number/party may indicate, or otherwise be used to gauge, the urgency of the most recent missed call.

Figure 10:
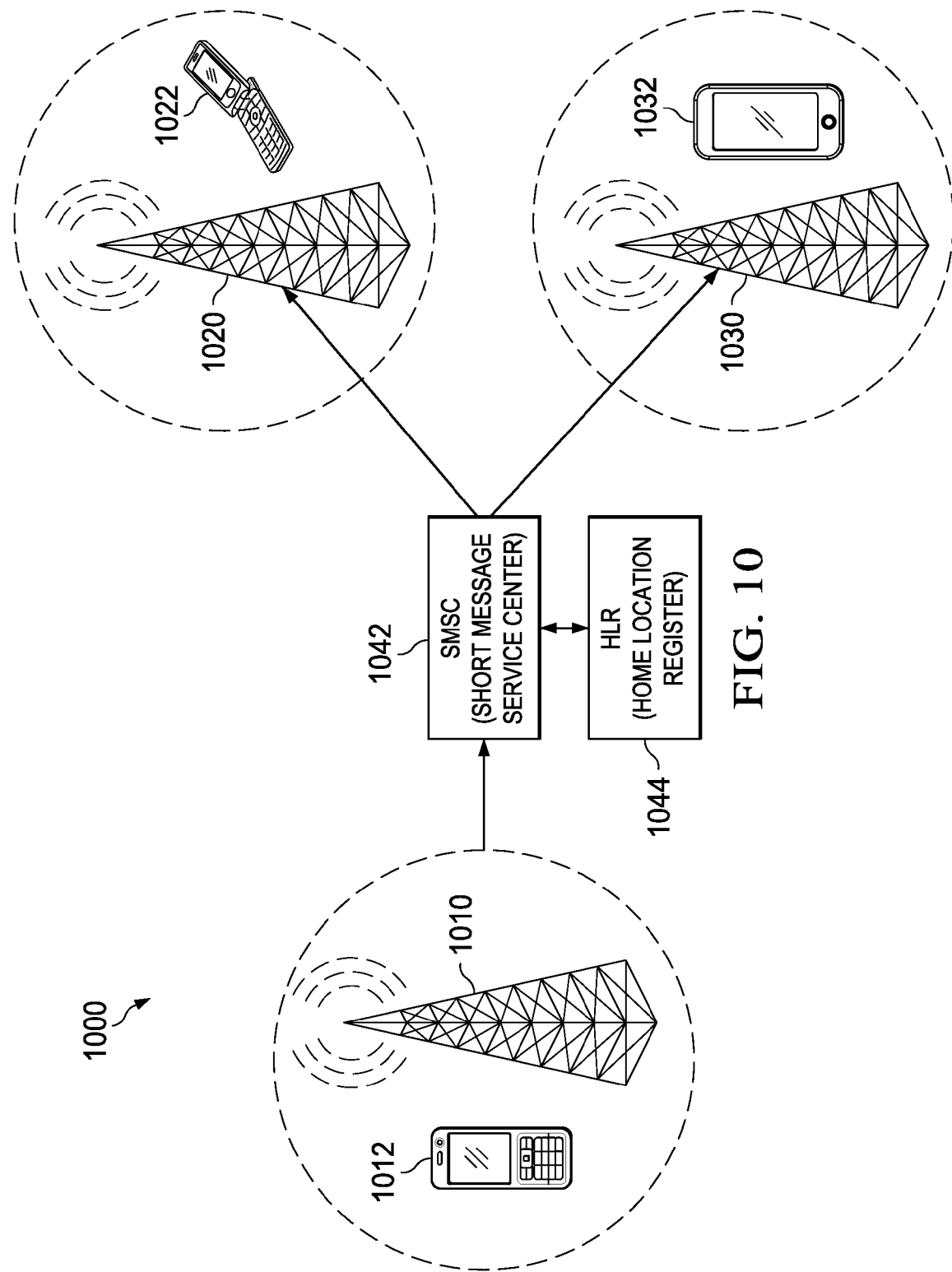
FIG. 10 illustrates a diagram of a Short Message Service (SMS) system for transporting missed call notifications.

In some embodiments, missed call notifications may be sent via a messaging service, such as a Short Message Service (SMS) or another messaging service provided by wireless service providers. FIG. 10 illustrates a network 1000 for providing SMS to mobile subscribers. As shown, the network includes a plurality of base stations, 1010, 1020, 1030, a plurality of mobile devices 1012, 1022, and 1023, a short message service center 1042, and a home location register 1044. In this example, the mobile device 1012 sends an SMS notification message to the base station 1010, which forwards the message to the SMSC 1042. The SMS message(s) is/are addressed to the mobile devices 1022, 1032, and the SMSC 1042 references the HLR 1044 to determine the location of the mobile devices 1022, 1032. The HLR 1044 may store information that indicates which access point (AP) the mobile devices 1022, 1032 are presently attached to. In this example, the HLR 1044 indicates that the mobile device 1022 is attached to the base station 1020, and that the mobile device 1032 is attached to the base station 1030. Accordingly, the SMSC 1042 forwards the respective SMS messages to the corresponding base stations 1020, 1030, which relay the SMS messages to the mobile devices 1022, 1032.

In some embodiments, other messaging services are used to send notifications to contacts of a missed call notification contact list. For example, notification messages may be sent via Enhanced Messaging Service (EMS) and/or Multimedia Messaging Service (MMS). SMS, EMS, and MMS communication protocols are defined by third generation partnership project (3GPP) technical specification (TS) 23.040, which is incorporated herein by reference as if reproduced in its entirety. In other embodiments, notifications via social network sites, such as Facebook, Twitter, etc.

Figure 11:
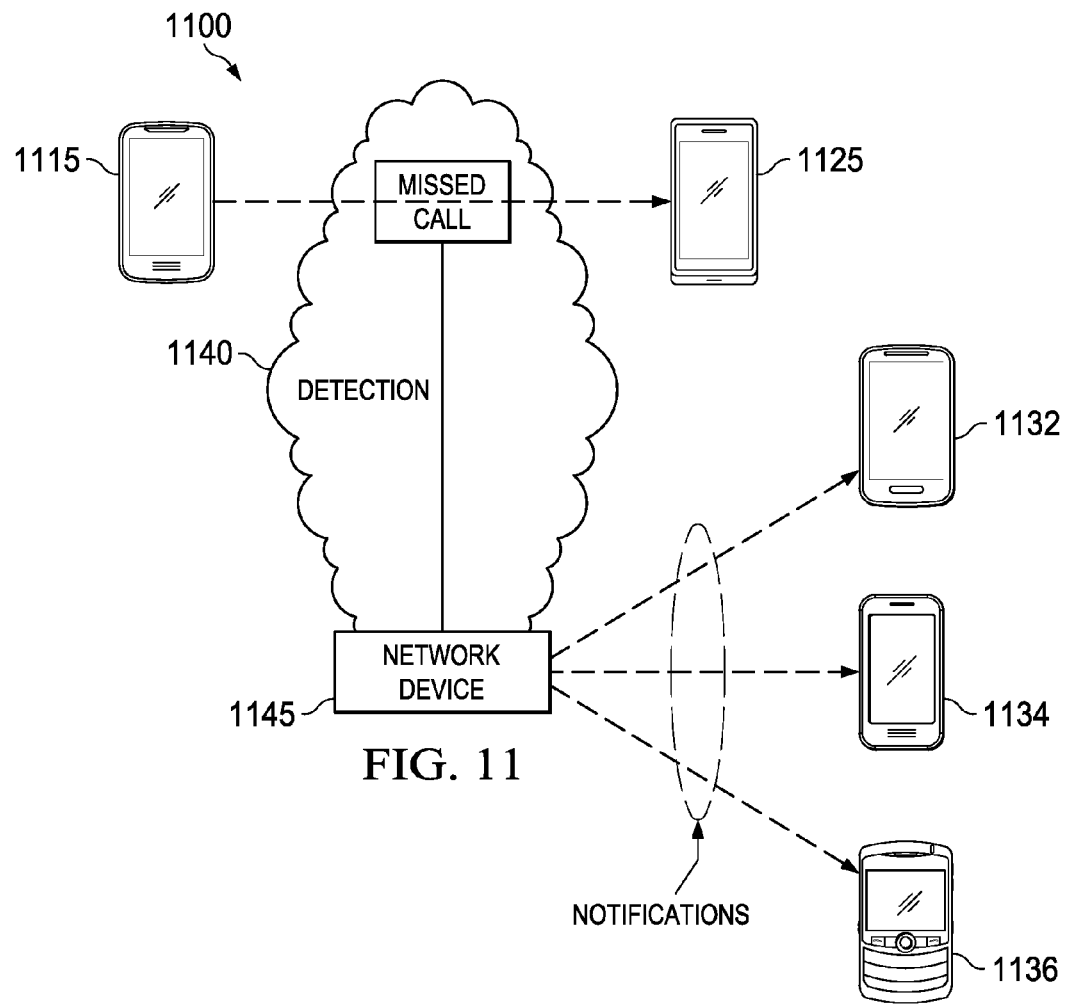
FIG. 11 illustrates a diagram of another embodiment system for notifying a called party of a missed call.

In some embodiments, missed call notifications may originate from a network device. FIG. 11 illustrates an embodiment system 1100 in which missed call notifications originate from a network device 1145 of a network 1140. As shown, the network device 1145 detects a missed call from a calling party 1115 on a mobile device 1125 of a called party. The network device then sends missed call notifications to contacts 1132, 1134, 1136 of the called party. The network device 1145 may store a list of privileged calling numbers as well as a missed call notification contact list for the mobile device 1125. The list of privileged calling numbers and the missed call notification contact list may be pre-configured by the called party prior to the missed call.

Figure 12:
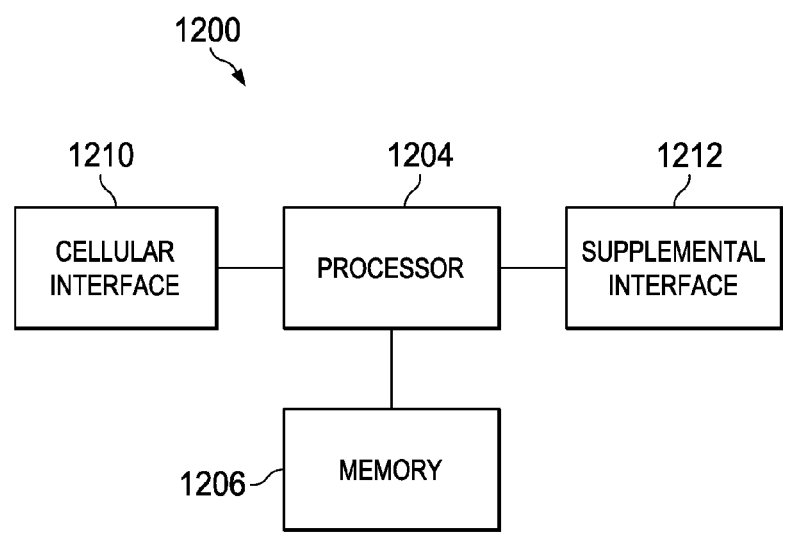
FIG. 12 illustrates a block diagram of an embodiment communications device.

FIG. 12 illustrates a block diagram of an embodiment of a communications device 1200, which may be equivalent to one or more devices (e.g., mobile device, base stations, etc.) discussed above. The communications device 1200 may include a processor 121204, a memory 1206, a cellular interface 1210, and a supplemental wireless interface 1212, which may (or may not) be arranged as shown in FIG. 12. The processor 1204 may be any component capable of performing computations and/or other processing related tasks, and the memory 1206 may be any component capable of storing user data, programming and/or instructions for the processor 1204. The cellular interface 1210 may be any component or collection of components that allows the communications device 1200 to communicate using a cellular signal, and may be used to receive and/or transmit information over a cellular connection of a cellular network. The supplemental interface 1212 may be any component or collection of components that allows the communications device 1200 to communicate data or control information via a supplemental protocol. For instance, the supplemental interface 1212 may be a non-cellular wireless interface for communicating in accordance with a Wireless-Fidelity (Wi-Fi) or Bluetooth protocol.

The same techniques and mechanisms used for missed call notification may be used for missed text, calendar event alert or emergency alert notification (e.g., a doctor appointment reminder, etc.), such as for notification of missed wireless emergency alerts (WEA). The term mobile device should be interpreted to include the mobile device as well as applications installed on the mobile device. Accordingly, actions described as being performed by a mobile device should be interpreted to include functions performed by applications installed on the mobile device unless otherwise specified. Moreover, actions/steps described as being performed by the mobile device may be performed by a network device, e.g., a server, etc.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method of missed call notification, the method comprising:
   detecting a missed call from a calling party to a mobile device of a called party; and
   sending, by a device, a voice or text notification of the missed call to one or more predefined contact numbers when one or more predefined conditions have been satisfied, the one or more predefined contact numbers being associated with one or more devices that are separate and distinct from the mobile device of the called party, wherein the voice or text notification specifies a group classification associated with the calling party without specifying a name of the calling party and without specifying a calling number of the calling party.

2. The method of claim 1, wherein the one or more predefined conditions require that the mobile device has received a threshold number of missed calls from a calling number within a predefined period, and that the called party has not acknowledged any of the missed calls.

3. The method of claim 1, wherein the one or more predefined conditions require that a calling number of the calling party is included in a list of privileged calling numbers.

4. The method of claim 3, wherein the list of privileged calling numbers is pre-configured by the called party in a network storage location that is separate from the mobile device.

5. The method of claim 1, wherein the one or more predefined conditions require that the mobile device has not been accessed by a user within a predefined period of time.

6. The method of claim 5, wherein the one or more predefined conditions require that a location of the mobile device has remained static for a predefined period of time.

7. The method of claim 1, wherein the one or more predefined contact numbers include at least one contact number for a user that is different than the called party.

8. The method of claim 1, wherein the voice or text notification is a text message.

9. The method of claim 1, wherein the voice or text notification is a voice mail or automated voice message.

10. The method of claim 1, wherein the voice or text notification is a message containing text that is sent via a social networking website.

11. The method of claim 1, wherein the voice or text notification specifies a time the missed call was received.

12. The method of claim 1, wherein the classification indicates that the missed call was received from a family member.

13. The method of claim 1, wherein the classification indicates that the missed call was received from a colleague.

14. The method of claim 1, wherein sending the voice or text notification of the missed call to the one or more predefined contact numbers comprises:
   determining whether the missed call is received during a first time period;

sending the voice or text notification to a first set of one or more predefined contact numbers when the missed call was received during the first time period; and sending the voice or text notification to a second set of one or more predefined contact numbers when the missed call was received outside the first time period.

15. The method of claim 14, wherein the second set of one or more predefined contact numbers includes at least one contact number that is excluded from the first set of one or more predefined contact numbers, or vice versa.

16. The method of claim 1, further comprising:
establishing a list of approved contacts prior to detecting the missed call, wherein the list of approved contacts includes users associated with the one or more predefined contact numbers to which the voice or text notification is sent.

17. The method of claim 16, wherein establishing the list of approved contacts comprises:
prompting the called party to identify one or more candidate contacts to be included in the list of approved contacts;
sending an invitation to each of the one or more candidate contacts, the invitation requesting consent on behalf of the one or more candidate contacts to be added to the list of approved contacts;
determining which of the one or more candidate contacts have consented to being added to the list of approved contacts; and
adding, to the list of approved contacts, candidate contacts that have consented to be added to the list of approved contacts.

18. The method of claim 1, further comprising:
determining, by the device, whether the predefined condition has been satisfied.

19. The method of claim 18, wherein the device is the mobile device.

20. The method of claim 18, wherein the device is a network device.

21. The method of claim 1, wherein the one or more predefined contact numbers are listed in a missed call notification contact list.

22. The method of claim 21, wherein the missed call notification contact list is pre-configured by the called party in a network storage location that is separate from the mobile device.

23. A device comprising:
one or more processors; and
a non-transitory computer readable storage medium storing programming for execution by the one or more processors, the programming including instructions to:
detect a missed call from a calling party to a mobile device, wherein the mobile device is associated with a called party; and
send a voice or text notification of the missed call to one or more predefined contact numbers when one or more predefined conditions have been satisfied, the one or more predefined contact numbers being associated with one or more devices that are separate and distinct from the mobile device of the called party, wherein the voice or text notification specifies a group classification associated with the calling party without specifying a name of the calling party and without specifying a calling number of the calling party.

24. The device of claim 23, wherein the device is the mobile device.

25. The device of claim 23, wherein the device is a network device.

26. The device of claim 23, wherein the one or more predefined conditions require that the mobile device has received a threshold number of missed calls from the calling party within a predefined period, and that the called party has not acknowledged any of the missed calls.

27. The device of claim 23, wherein the one or more predefined conditions require that a calling number of the calling party is included in a list of privileged calling numbers.

28. The device of claim 27, wherein the list of privileged calling numbers is pre-configured by the called party in a network storage location that is separate from the mobile device.

29. The device of claim 23, wherein the one or more predefined conditions require that the mobile device has not been accessed by a user within a predefined period of time.

30. The device of claim 29, wherein the one or more predefined conditions require that a location of the mobile device has remained static for a predefined period of time.

31. The device of claim 23, wherein the classification indicates that the missed call was received from a family member.

32. The device of claim 23, wherein the classification indicates that the missed call was received from a colleague.

33. A non-transitory computer program product for installation on a mobile device, the non-transitory computer program product comprising programming for execution by the mobile device, the programming including instructions to:
detect a missed call from a calling party to a mobile device of a called party; and
send a voice or text notification of the missed call to one or more predefined contact numbers when one or more predefined conditions have been satisfied, the one or more predefined contact numbers being associated with one or more devices that are separate and distinct from the mobile device of the called party, wherein the voice or text notification specifies a group classification associated with the calling party without specifying a name of the calling party and without specifying a calling number of the calling party.

34. The non-transitory computer program product of claim 33, wherein the one or more predefined conditions require that a calling number of the calling party is included in a list of privileged calling numbers.

35. The non-transitory computer program product of claim 33, wherein the one or more predefined conditions require that the mobile device has not been accessed by a user within a predefined period of time.

36. The non-transitory computer program product of claim 33, wherein the classification indicates that the missed call was received from a family member.

37. The non-transitory computer program product of claim 33, wherein the classification indicates that the missed call was received from a colleague.

38. A network device comprising:
one or more processors; and
a non-transitory computer readable storage medium storing programming for execution by the one or more processors, the programming including instructions to:
determine that a missed call was received by a mobile device associated with a called party, the missed call originating from a calling number;
determine that the calling number is included in a list of privileged calling numbers; and send a voice or text notification of the missed call to one or more predefined contact numbers when one or more predefined conditions have been satisfied, the one or more predefined contact numbers being associated with one or more devices that are separate and distinct from the mobile device of the called party, wherein the voice or text notification specifies a group classification associated with the calling party without specifying a name of the calling party and without specifying a calling number of the calling party.

39. The network device of claim 38, wherein the one or more predefined conditions require that the mobile device has received a threshold number of missed calls from the calling number within a predefined period, and that the called party has not acknowledged any of the missed calls.

40. The network device of claim 38, wherein the one or more predefined conditions require that the calling number is included in a list of privileged calling numbers.

41. The network device of claim 40, wherein the list of privileged calling numbers is pre-configured by the called party in a network storage location that is separate from the mobile device.

42. The network device of claim 38, wherein the classification indicates that the missed call was received from a family member.

43. The network device of claim 38, wherein the classification indicates that the missed call was received from a colleague.

44. A system comprising:
a mobile device associated with a called party; and
one or more network devices,
wherein the mobile device and the one or more network devices are individually or collectively configured to determine that a missed call was received on the mobile device from a calling number, and to send a voice or text notification of the missed call to one or more predefined contact numbers when one or more predefined conditions have been satisfied, the one or more predefined contact numbers being associated with one or more devices that are separate and distinct from the mobile device of the called party, and wherein the voice or text notification specifies a group classification associated with the calling party without specifying a name of the calling party and without specifying a calling number of the calling party.

45. The system of claim 44, wherein the mobile device is configured to send the voice or text notification to the one or more predefined contact numbers of the called party.

46. The system of claim 44, wherein the one or more network devices are configured to send the voice or text notification to the one or more predefined contact numbers of the called party.

47. The system of claim 44, wherein the one or more network devices are operated by a service provider or network operator.

48. A method for facilitating compilation of missed call notification contact lists, the method comprising:
receiving, by a device, an invitation from a mobile device, the invitation inviting a candidate contact to be included in a list of contacts that will be notified when missed calls are received on the mobile device;
prompting the candidate contact to accept or decline the invitation;
sending, by the device, a response to the mobile device, the response indicating whether the candidate contact has accepted or declined the invitation; and
receiving, by the device, a voice or text notification of a missed call for a called party on the mobile device, wherein the voice or text notification specifies a group classification associated with a calling party without specifying a name of the calling party and without specifying a calling number of the calling party.

49. The method of claim 48, wherein the classification indicates that the missed call was received from a family member.

50. The method of claim 48, wherein the classification indicates that the missed call was received from a colleague.

51. A device comprising:
one or more processors; and
a non-transitory computer readable storage medium storing programming for execution by the one or more processors, the programming including instructions to:
receive an invitation from a mobile device, wherein the device is associated with a candidate contact, and wherein the invitation invites the candidate contact to be included in a list of contacts that will be notified when missed calls are received on the mobile device;
prompt the candidate contact to accept or decline the invitation;
send, by the device, a response to the mobile device, the response indicating whether the candidate contact has accepted or declined the invitation; and
receive, by the device, a voice or text notification of a missed call for a called party on the mobile device, wherein the voice or text notification specifies a group classification associated with a calling party without specifying a name of the calling party and without specifying a calling number of the calling party.

52. The device of claim 51, wherein the classification indicates that the missed call was received from a family member.

53. The device of claim 51, wherein the classification indicates that the missed call was received from a colleague.

* * * * *